(12) United States Patent
Flynn et al.

(10) Patent No.: US 6,393,359 B1
(45) Date of Patent: May 21, 2002

(54) SYSTEM AND METHOD FOR ESTIMATING AIRCRAFT FLIGHT DELAY

(75) Inventors: Lorraine Flynn; Mary Flynn, both of Newton; James Steinberg, Melrose, all of MA (US)

(73) Assignee: RLM Software, Inc., Boston, MA (US)

( * ) Notice: Subject to any disclaimer, the term of this patent is extended or adjusted under 35 U.S.C. 154(b) by 0 days.

(21) Appl. No.: 09/636,367

(22) Filed: Aug. 11, 2000

Related U.S. Application Data

(60) Provisional application No. 60/195,776, filed on Apr. 10, 2000, and provisional application No. 60/171,778, filed on Dec. 22, 1999.

(51) Int. Cl.$^7$ ................................................. G06G 7/76
(52) U.S. Cl. ........................................ 701/120; 701/15
(58) Field of Search ................................ 701/120, 202, 701/204, 14, 15

(56) References Cited

U.S. PATENT DOCUMENTS 6,049,754 A * 4/2000 Beaton et al. .............. 701/204

* cited by examiner

*Primary Examiner*—Yonel Beaulieu
(74) *Attorney, Agent, or Firm*—Bromberg & Sunstein LLP (57) ABSTRACT

A method and system estimate, in real time, the amount of any delay in departure of an aircraft flight from an airport. Various embodiments include receiving in a first computer process a conditions input that includes at least one member of a set including departure airport conditions, arrival airport conditions, and fleet conditions; and estimating in a second computer process the amount of delay based on the conditions input. User interfaces and data structures are also provided.

40 Claims, 6 Drawing Sheets

SYSTEM AND METHOD FOR ESTIMATING AIRCRAFT FLIGHT DELAY

The present application claims priority from provisional application serial number 60/171,778, filed Dec. 22, 1999, and provisional application serial number 60/195,776, filed Apr. 10, 2000. These related applications are hereby incorporated herein by reference.

TECHNICAL FIELD

The present invention relates to systems and methods for estimating delays from planned departure times of aircraft flights.

1. Background Art

It is known in the prior art to utilize real-time flight data to estimate the landing time of aircraft that is in flight.

2. Summary of the Invention

In a first embodiment of the invention there is provided a method of estimating, in real time, the amount of any delay, from a planned departure time, in departure of an aircraft flight from an airport. In this connection, for purposes of reference, it is considered that the aircraft belongs to a fleet (even if the fleet has only a single aircraft). Also for reference purposes, the flight is associated with a departure airport and an arrival airport. The method of this embodiment includes:
 a. receiving in a first computer process a conditions input that includes at least one member of a set including departure airport conditions, arrival airport conditions, and fleet conditions; and
 b. estimating in a second computer process the amount of delay based on the conditions input.

(For purposes of this description and the following claims, the first and second processes can be distinct processes, or the second process may be part of the first process.)

In further related embodiments, the conditions input includes at least two members of the set (optionally all three members of the set). Additionally, estimating the amount of delay includes separately determining a delay contribution from each member of the set included in the conditions input. Under circumstances wherein the conditions input includes departure airport conditions, determining the delay contribution from the departure airport conditions may include determining, for the departure airport, the departure demand and the departure capacity.

In a further related embodiment, the departure airport conditions may include weather at the departure airport, at an applicable departure time, and determining departure capacity at the departure airport includes evaluating a departure capacity function mapping weather conditions to capacity based on weather. The departure capacity function may be a table that is updated in real time on the basis of live air traffic data and weather condition data. In addition, determining departure demand may include accessing a flight schedule database and, optionally, live air traffic data. Also optionally, the flight schedule database may be updated in real time on the basis of live air traffic data.

Determining the delay contribution from the departure airport conditions may include evaluating a first delay function of departure demand and departure capacity to obtain a preliminary departure delay contribution. Additionally, determining the delay contribution from the departure airport conditions may include determining a recent average departure delay and evaluating a second delay function of the recent average departure delay and the preliminary departure delay contribution.

Analogous embodiments permit consideration of arrival airport conditions. Hence the conditions input may include arrival airport conditions, and determining the delay contribution from the arrival airport conditions then includes determining, for the arrival airport, the arrival demand and the arrival capacity.

In a further related embodiment, the arrival airport conditions include weather at the arrival airport, at an applicable arrival time, and determining arrival capacity at the arrival airport includes evaluating an arrival capacity function mapping weather conditions to capacity based on weather. The arrival capacity function may be a table that is updated in real time on the basis of live air traffic data and weather condition data.

In addition, determining arrival demand may include accessing a flight schedule database and, optionally, live air traffic data. The flight schedule database may be updated in real time on the basis of live air traffic data.

In related embodiments, determining the delay contribution from the arrival airport conditions includes evaluating a first delay function of arrival demand and arrival capacity to obtain a preliminary arrival delay contribution. Determining the arrival delay contribution from the arrival airport conditions may include determining a recent average arrival delay and evaluating a second delay function of the recent average arrival delay and the preliminary arrival delay contribution.

In other related embodiments, determining the delay contribution from fleet conditions includes determining when an aircraft is first likely to be available for the planned flight. In turn, determining when an aircraft is first likely to be available may include (i) accessing a flight segment database identifying, for an aircraft of the planned flight, an immediately previous flight number and departing airport; and (ii) estimating a landing time when the immediately previous flight shall have landed at the departure airport. In a further embodiment, if the landing time estimated is later by more than a threshold amount than the planned departure time, then determining when an aircraft is first likely to be available includes determining when an alternative aircraft is first likely to be available.

In another embodiment, determining the delay contribution from fleet conditions includes accessing historical fleet performance data providing historical performance of the fleet. Optionally, the historical fleet performance data include on-time performance data.

In yet another embodiment, determining the delay contribution from at least one of departure airport conditions and arrival airport conditions includes using official airport delay data. Optionally, determining the delay contribution from each of departure airport conditions and arrival airport conditions includes using official airport delay data.

In another embodiment, the invention provides a system for estimating, in real time, the amount of any delay, from a planned departure time, in departure of an aircraft flight from an airport. In this embodiment, the aircraft belongs to a fleet, the flight is associated with a departure airport and an arrival airport. The system of this embodiment includes:
 a first computer process for receiving a conditions input that includes at least one member of a set including departure airport conditions, arrival airport conditions, and fleet conditions; and
 a second computer process for estimating the amount of delay based on the conditions input. In a further related embodiment, (i) the conditions input includes at least two members of the set and (ii) the second computer process for estimating the amount of delay includes processes for separately determining a delay contribution from each member of the set included in the conditions input. In another embodiment, the invention provides a digital electronic storage medium containing data correlating, with each of a series of at least three quantized weather conditions, the capacity of an airport to support departing flights. In a further related embodiment, the digital electronic storage medium contains data, correlating with each of a series of at least four quantized weather conditions, the capacity of an airport to support departing flights. Another embodiment provides a digital electronic storage medium containing data correlating, with each of a series of at least three quantized weather conditions, the capacity of an airport to support arriving flights. In a further embodiment, there is provided a digital electronic storage medium containing data, correlating with each of a series of at least four quantized weather conditions, the capacity of an airport to support arriving flights.

In yet another embodiment, there is provided a system for estimating, in real time, the amount of any delay, from a planned departure time, in departure of an aircraft flight from an airport. The system embodiment includes:

a user entry process permitting a user to generate a delay query that provides flight parameters over a communications network sufficient to determine the aircraft flight;

a delay determination process, in communication with the user entry process, that, substantially contemporaneously with the delay query, estimates a delay parameter associated with any delay in departure of the aircraft flight specified by the query; and a presentation process, in communication with the delay determination process, that presents to the user the delay parameter.

Alternatively, or in addition, the delay determination process estimates a delay parameter associated with any delay in departure of the aircraft flight specified by the query, the delay parameter being a measure of the probability of a delay in departure. The measure may be discrete or continuous. If it is discrete it may be at least bi-valued and optionally at least tri-valued.

Alternatively or in addition, the delay parameter may be an estimate of at least one of the most probable time of departure and the most probable amount of delay in departure. Also alternatively, the presentation process presents to the user delay information corresponding to the delay parameter. The delay information may be a notification delivered a specified duration before the most probable time of departure. In a further embodiment, the notification is delivered over a network and triggers an alarm.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
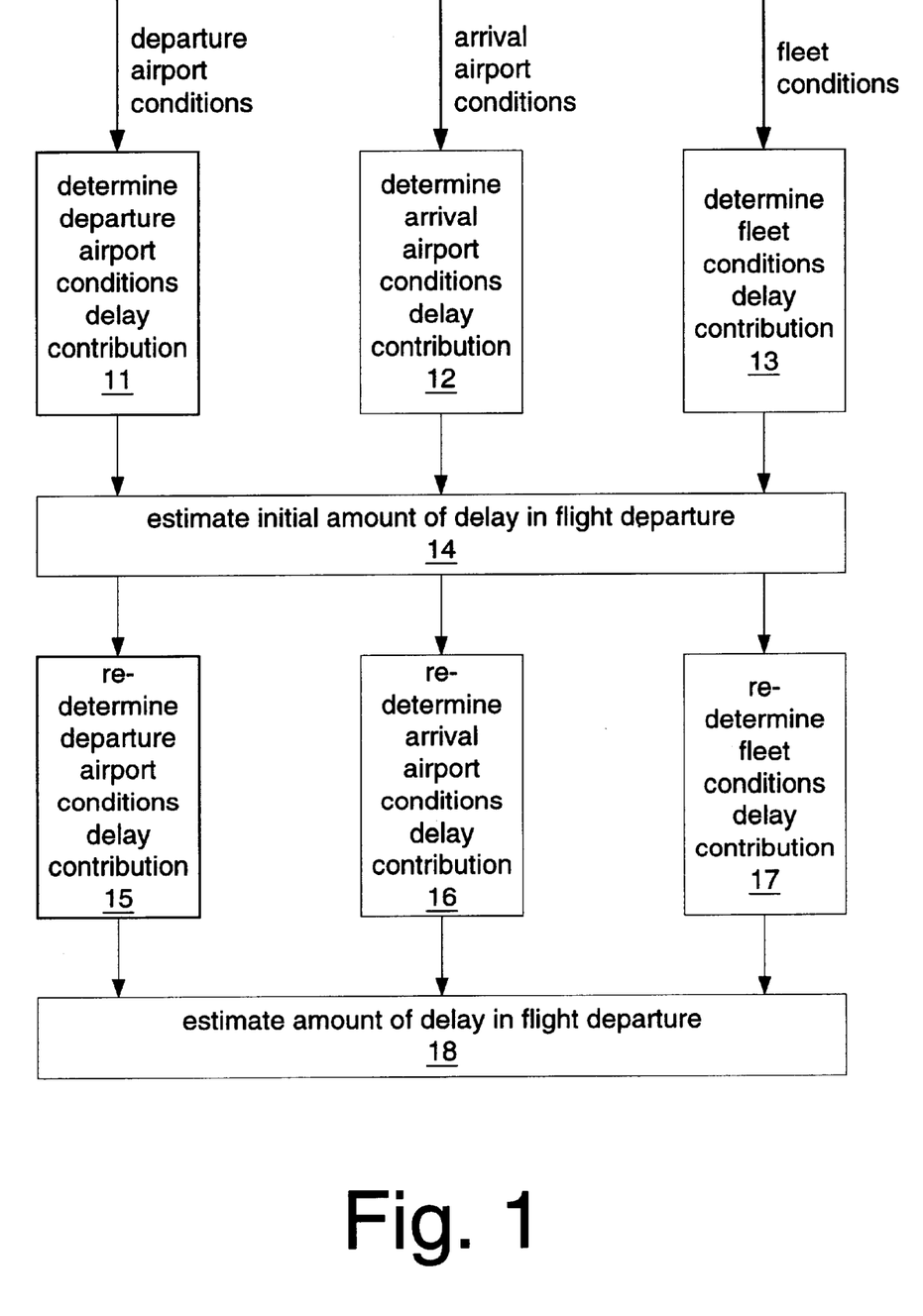
FIG. 1 is a block diagram providing an overview of data flow in accordance with a preferred embodiment of a method in accordance with the present invention.

FIG. 1 is a block diagram providing an overview of data flow in accordance with a preferred embodiment of a method in accordance with the present invention. In this embodiment, it can be seen from the diagram that estimating the amount of delay in flight departure in accordance with the box 14 depends on three distinct processes. In accordance with process 11, the departure airport conditions delay contribution is determined based on departure airport conditions. Similarly, in accordance with process 12, the arrival airport conditions delay contribution is determined based on arrival airport conditions. Arrival airport conditions delay is computed in a manner analogous to departure airport conditions delay, but often has less importance as a contributor to delay in a departing flight when the planned flight is over a longer distance, since the arrival airport will have some intervening time to handle problems associated with any diminished capacity; this effect is taken into account by the algorithm described below in connection with FIG. 3. In accordance with process 13, the fleet conditions delay contribution is determined based on fleet conditions. Fleet conditions include determination of when an aircraft is first likely to be available; alternatively or in addition, they include historic flight performance of the fleet. All three of these delay contributions are used in estimating the amount of delay in flight departure in accordance with box 14. In typical embodiments, the amount of delay in departure may be determined by summing all of the delay contributions that are non-overlapping.

In practice, many of the delay contributions are in fact overlapping, and in a simple embodiment, the delay in departure may be determined in box 14 on the basis of the delay contribution that is the greatest. For example, it may be determined in box 13 that fleet conditions will contribute a delay of one hour, and in box 14 that the fleet conditions delay contribution is the greatest of the three delay contributions calculated in boxes 11 through 13. Perhaps there is a delay contribution in box 12 due to arrival airport conditions; yet this contribution is by definition an estimate of the delay in departure caused by conditions at the arrival airport—for example, caused by inclement weather at such airport—and since this delay in departure is concurrent with the delay calculated in box 13 and it is less than the delay calculated in box 13, then it can be discarded in estimating in box 14 the delay. With an approach such as this the initial estimate in box 14 is the system output in a simple embodiment.

Nevertheless, it is still conceivable that arrival airport conditions could contribute a further delay under the circumstances of this example. The delay contribution calculated in box 12 attributable to arrival airport conditions is made (for example) without consideration of the delay contribution from fleet conditions determined in box 13. Given that fleet conditions in this example is contributing a delay of one hour, it may be that, with a one hour delay in departure, the conditions in the arrival airport (projected as of one hour after scheduled arrival time)will be even more congested, causing a hold on the departure of the flight in question. Hence in a further embodiment, after determining an initial amount of delay in box 14, the data from this calculation are used in redetermining the departure airport conditions delay contribution (in box 15), the arrival airport conditions delay contribution (in box 16), and the fleet conditions delay contribution (in box 17). These various delay contributions as redetermined are used to estimate the amount of delay in flight departure in box 18. While we have shown two iterations in the process of delay estimation, it is within the scope of the invention to use further iterations as well, so that the result of the process in box 18 may be used as a further basis for redetermining the respective delay contributions and the resultant overall delay.

For purposes of example, and in a common implementation, the "aircraft" may be an airplane, a "planned" flight may be a scheduled flight of an airplane operated by an airline, and the "fleet" may be the airplanes operated by an airline. We will sometimes therefore refer to an "airplane" and a "scheduled flight" in this context. Additionally, reference to "airline conditions" is in the context of the airline's fleet. The invention, of course, is not limited to this implementation, and is equally applicable to other types and fleets of aircraft and to flights that may be planned but not formally or regularly scheduled.

In implementing embodiments of the present invention, it is not necessary to derive data concerning every airport. For example, some number of airports—of the order of 50 or 100—in the United States accounts for a significant amount of United States air traffic-probably more than 90%—of such air traffic. Accordingly processing data for these 50 to 100 airports provides a reasonably thorough picture of air traffic delay in the United States. Nevertheless, there is considerable benefit in taking into account data for other than these airports, particularly in connection with the evaluation of arrival delays associated with flights to or from such other airports.

The embodiments described herein are implemented using a digital computer system, in some cases advantageously one or more computers coupled to a computer network. The processes described in connection with the figures herein are therefore carried out by use of a digital computer system. In one embodiment, the delay determinations herein are carried out by a computer system pursuant to inquiries provided to the system by users who access the system's resources over a network, including over a network such as the Internet.

For example, the embodiments herein are suitable for use in services analogous to those offered on web sites such as www.usatoday.com, and www.travelocity.com. These sites, the content and interface for which are hereby incorporated herein by reference, provide a user an opportunity to use a web browser interface to provide to a web server input data defining a particular airline flight number serving as a query; the server then provides to the user in response to the query a resulting web page containing estimated arrival information for the designated flight.

Embodiments herein can provide estimated departure information for a designated flight. In this connection, FIG. 7 is a block diagram of a system, in accordance with an embodiment of the present invention, providing a user interface for accessing departure delay information. In this embodiment, a user entry process 71 permits a user to generate a delay query that provides flight parameters sufficient to determine the aircraft flight in question. The delay query is issued by user over network 70. A delay determination process 72 is in communication over network 70 with the user entry process 71. The delay determination process estimates a delay parameter associated with any delay in departure of the aircraft flight specified by the query; typically the delay determination process may be an embodiment of the methods described in connection with FIGS. 1–5, and may be carried out for example by a system of the type described in connection with FIG. 6. In various embodiments, the delay determination process estimates a delay parameter substantially contemporaneously with the delay query. By "substantially contemporaneously", we mean in this description and in the claims, either that the query triggers the delay determination process or that the delay determination process is performed for a given flight repetitively over relativey short intervals, for example, every 15 minutes or every 10 minutes or every 5 minutes or even more frequently, so that the results are fresh for the user.

A presentation process 73 is also in communication over the network with the delay determination process 72, and the presentation process 73 presents to the user the delay parameter.

The delay parameter may be any of a variety of different types of information and may be presented in any of a wide range of formats. In text or speech interface, or graphic format, for example, the delay parameter may be presented as estimated minutes after the scheduled time of departure. Alternatively, the departure information may be presented as an estimate of the most probable time of departure. Alternatively it may be presented as an estimate of the most probable amount of delay in departure. Or it may be presented as an estimate of both of these items. This delay parameter may be presented alternatively (or in addition) as a notification delivered to the user a specified duration before the most probable time of departure. For example, the user may be furnished with a mechanism to be notified (by pager or cell phone or other communications medium provided with a ringer or other alarm arrangement) when it is two hours before the most probable time of departure, so that the user is alerted to leave to go to the departure airport.

Alternatively or in addition, the delay parameter may be a measure of the probability of a delay in departure. The probability may be discrete or continuous. If it is discrete, it may, for example, be bi-valued (delay is probable or not probable) or tri-valued (delay is not probable, somewhat probable, or highly probable). The probability may be presented graphically or in text format or both; or alternatively or in addition using a speech interface. The graphic presentation may for example be a bar graph or a colored icon, with the color indicating the probability of delay. Or, for example, there may be presented the scheduled and estimated departure time, and the estimated time may be presented in a color indicative of the likelihood of delay. In another related and simple format, the departure information may be presented as one of three colors: green, yellow, or red, meaning, respectively, no likely delay in departure, some likely delay in departure, and very likely delay in departure. Of course the delay query herein may, but need not necessarily, utilize web pages over the Internet. Any suitable input interface may be used, including interfaces available from the hosts of the www.phone.com web site (which is hereby incorporated herein by reference) for wireless phones and other devices, so that a mobile user may obtain departure delay information. In addition, in another embodiment, in standard wire-based telephone systems, there may be employed interfaces such as touch-tone, voice recognition, and natural language systems. Indeed, these are not all possible interfaces. It is within the scope of the present invention to employ mixed media, so that, for example, a spoken natural language request made using a wireless phone might trigger a response that is delivered in a graphic format. As a consequence of the implementation of the processes described herein, various embodiments of the invention include a computer system in which is running the processes described herein.

Figure 2:
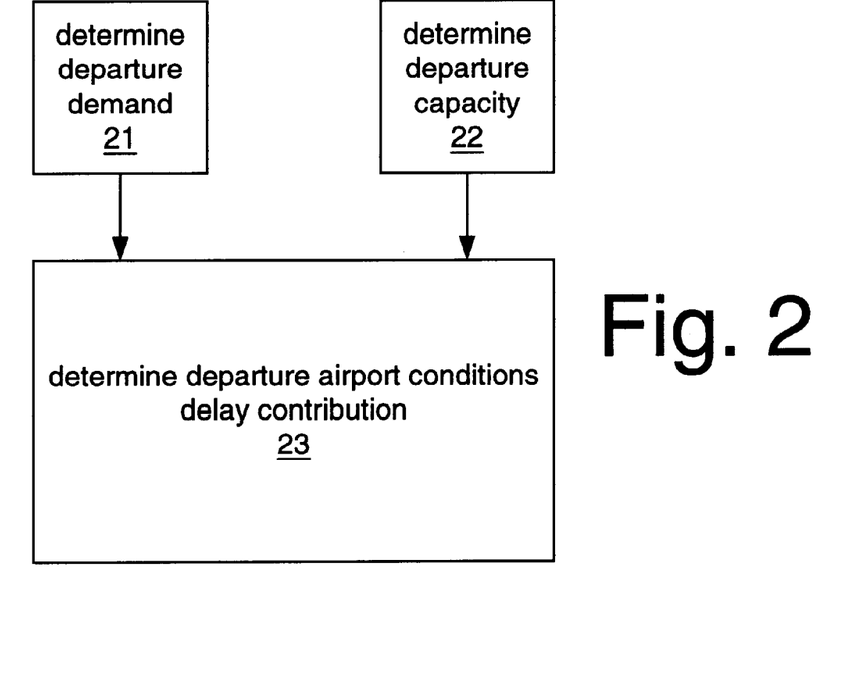
FIG. 2 is a block diagram showing further detail of data flow for calculation of the departure airport conditions delay contribution in accordance with block 11 of FIG. 1.

FIG. 2 is a block diagram showing further detail of data flow for calculation of the departure airport conditions delay contribution in accordance with block 11 of FIG. 1. Here it can be seen that the process 23 of determining the departure airport conditions delay contribution depends on determining departure demand in accordance with process 21 and determining departure capacity in accordance with process 22.

Figure 3:
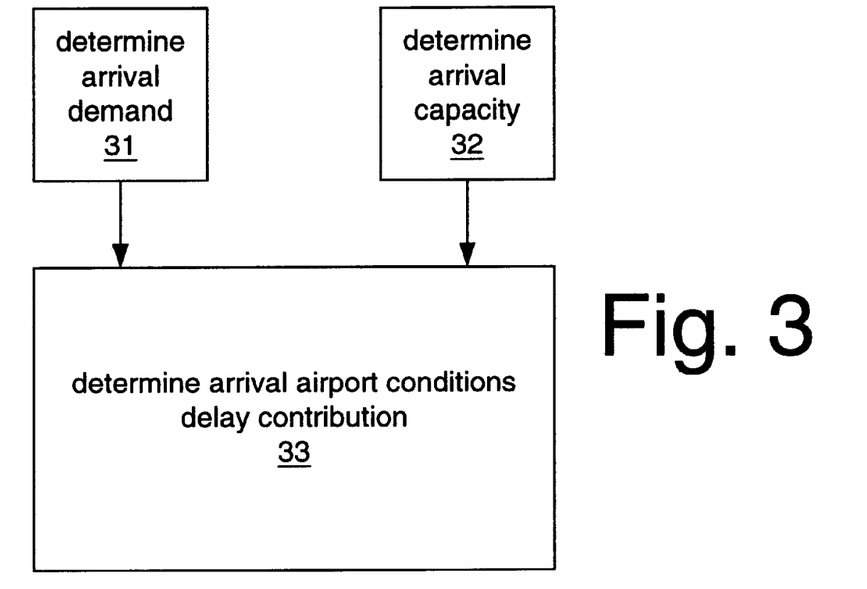
FIG. 3 is a block diagram showing further detail of data flow for calculation of the arrival airport conditions delay contribution in accordance with block 12 of FIG. 1.

FIG. 3 is a block diagram showing further detail of data flow for calculation of the arrival airport conditions delay contribution in accordance with block 12 of FIG. 1. Here it can be seen that the process 33 of determining the arrival airport conditions delay contribution depends on determining arrival demand in accordance with process 31 and determining arrival capacity in accordance with process 32.

Figure 4:
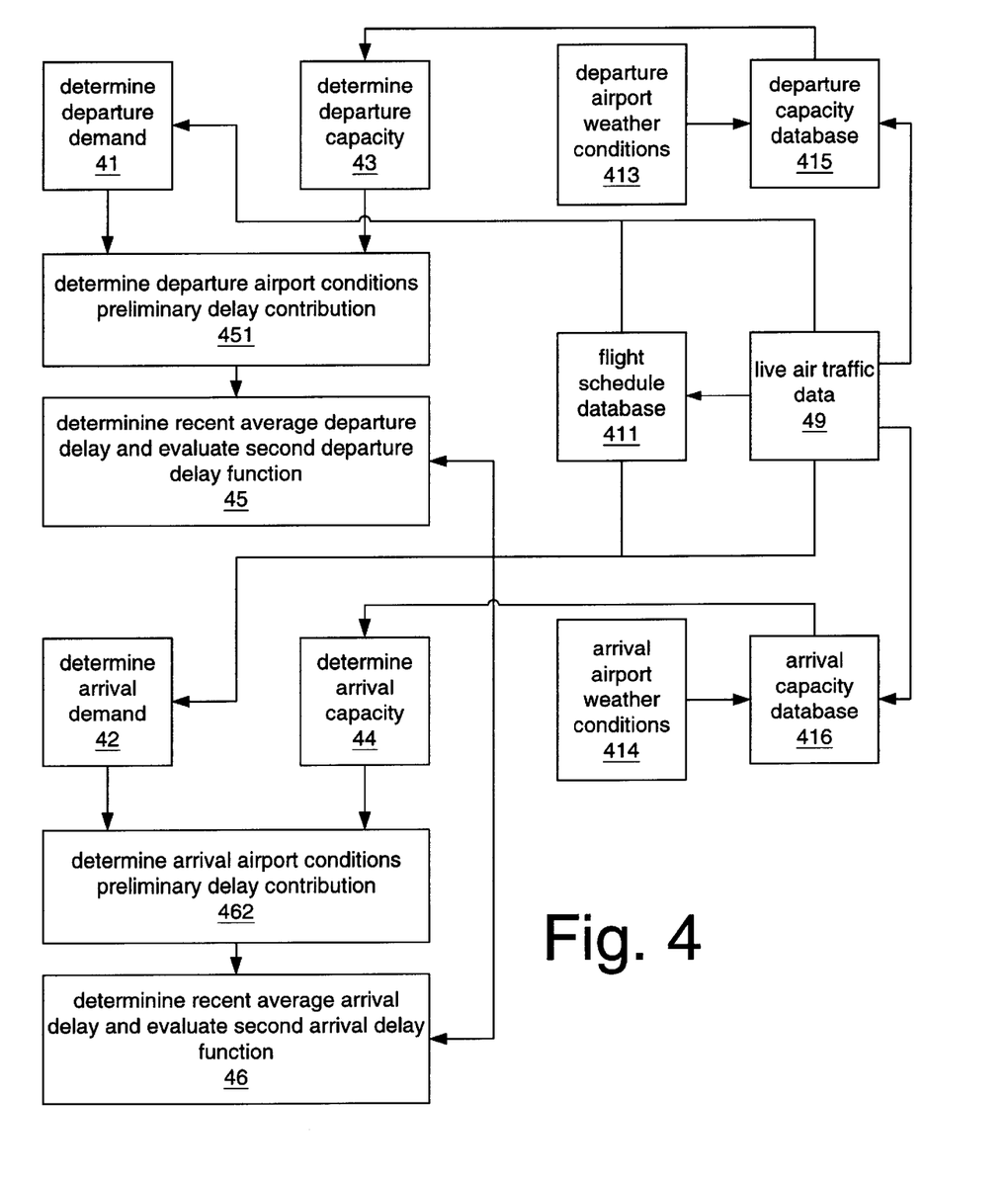
FIG. 4 is a block diagram showing yet further detail of the data flow of FIGS. 2 and 3 in connection with the calculation of departure airport conditions delay contribution and arrival airport conditions delay contribution.

FIG. 4 is a block diagram showing yet further detail of the data flow of FIGS. 2 and 3 in connection with the calculation of departure airport conditions delay contribution and arrival airport conditions delay contribution. In this diagram it can be seen that both the determination of departure demand in box 41 and the determination of arrival demand in box 42 depend on accessing a flight schedule database in box 411. Information from the flight schedule database 411 is updated by access to live air traffic data in box 49. Live air traffic data may be obtained directly from air traffic control or air management data, such as data from the FAA, indirectly from devices that monitor air traffic control or air traffic management devices (as by passive radar monitoring), or by monitoring or polling other devices on aircraft (such as transponders or radio transmitters that give, for example, gps-derived position data).

FIG. 4 also shows that determination of departure capacity at the departure airport in accordance with box 43 depends on data from the departure capacity data base 415; the departure capacity data from the data base 415 in turn depend on departure airport weather conditions provided by box 413 and live air traffic data from box 49. In an analogous matter, the determination of arrival capacity at the arrival airport in accordance with box 44 depends on data from the arrival capacity data base 416; the arrival capacity data from the data base 416 in turn depend on the arrival airport weather conditions provided by box 414 and live air traffic data from box 49.

In this connection, weather conditions at a given airport are suitably quantized into, for example, any of 10 different values. Departure capacity and arrival capacity are suitably described in terms of a number of flights per unit of time (takeoffs in connection with departure capacity, landings in connection with arrival capacity) as a function of quantized weather. The unit of time, for example, may be the quarter hour. The database provides historic capacity as a function of each weather value. In each case (for both departure capacity and for arrival capacity determinations), the weather conditions database is preferably updated in real time, so as to correct for long-term extrinsic factors such as runway construction, etc. that affect capacity.

It can also be seen in FIG. 4 that calculation of the departure airport conditions delay involves first determining a preliminary delay contribution in box 451. Next there is determined recent average departure delay, and on the basis of this determination that there is evaluated a second departure delay function in box 45. Similarly, calculation of the arrival airport conditions delay involves first determining a preliminary delay contribution in box 462. Next there is determined recent average arrival delay, and on the basis of this determination there is evaluated a second arrival delay function in box 46.

In connection with FIG. 4, we now discuss in outline form algorithms suitable for the processes just discussed. Preliminarily, it assumed here that the flight has not departed. Available data from the U.S. Federal Aviation Administration (FAA), for example, will indicate whether a flight has departed, and it is within the scope of embodiments of the present invention to determine whether a flight has departed. (It is known in the art to estimate the time of arrival of a departed flight on the basis of available FAA data.) For determining the departure airport conditions preliminary delay contribution in accordance with box 451, a suitable algorithm is as follows:

From the Schedule Database, get SDepAp [the scheduled departure airport] and the SDepTime [scheduled departure time].

If PresentTime>SDepTime and flight has not departed, then ADepTime [assumed departure time of flight]= PresentTime Else ADepTime=SDepTime.

Departure_Capacity_Calculation:

Get DepApSchedDemand [number of flights scheduled to depart from SDepAp in the specified interval T, initially in this embodiment, 30 minutes] for ADepTime from the Schedule Database. Modify DepApSchedDemand to eliminate those flights which don't actually fly, and add unscheduled flights (such as general aviation, for example) which do fly.—If departure within the hour use live air traffic data for this quantity.

Calculate the CurrentWxCond [quantized weather value—at the ADepTime—here, a value 1–10, affected by factors such as winds, visibility, RVR, precipitation, Obscurations, sky conditions (ceiling, etc.), temp and dewpoint, pressure]

Retrieve the CurDepCapacityforWx [departure capacity, in number of flights in the specified time interval T, for ADepTime] from the Departure/ Arrival Capacity Database for SDepAp and the CurrentWxCond.

If CurDepCapacityforWx<K1Ap [an airport-dependent constant], then increment specified time interval T, and go to Departure_Capacity_Calculation [above, to recalculate based on the larger time interval T].

Else determine DemandDiff=(DepApSchedDemand− CurDepCapacityforWx)

If (DemandDiff<K4ap [an airport—dependent constant]) then WxDelay=0

Else WxDelay=DemandDiff*(T/ CurDepCapacityforWx)

Alternatively, WxDelay may be derived from a lookup value from a database calculated from historic data as to the time interval required to restore undelayed service for various values of DemandDiff.

A suitable algorithm for the process of box 45 is as follows:

If time of departure is not within (for example) 5 hours, AvgDepDelay [defined in next paragraph]=0 [When departure time is too remote, do not use current airport conditions to project delay in such flight. Can use weighting based on remoteness of departure time.]

Compute the AvgDepDelay [the average delay of flights departing within a recent time period, such as a half hour, where the delay is the difference between actual and scheduled departure times; see Table 4].

Compute DepDelayTrend [trend in departure delays; extrapolated from data in Table 4], and use to update AvgDepDelay for ADepTime.

If (AvgDepDelay>WxDelay) PrelimDepDelay [preliminary delay contribution for departure airport conditions]=AvgDepDelay Else PrelimDepDelay=WxDelay PrelimDepDelay=PrelimDepDelay*F, where F is a function of SDeDTime and ADepTime and the departure airport. A suitable function is:

$$F = \frac{K5Ap}{1 + \frac{ADepTime - SDepTime}{T}},$$

where K5Ap is an airport—dependant constant having a typical value of about unity (within an order of magnitude).

The FAA has made available airport delay data, and such data may be used in a variety of ways. (We call, for the purposes of this description and the following claims, airport delay data from an official source, such as the FAA, or other administrative or public or quasi-public organ, "official airport delay data". In one embodiment, the official airport delay data may by used in lieu of calculating PrelimDep-Delay in the manner above. Alternatively, the data may be used to provide a check upon or an update to PrelimDep-Delay.

Analogous algorithms apply to implementing the processes with respect to the arrival airport. For determining the arrival airport conditions preliminary delay contribution in accordance with box 462, a suitable algorithm is as follows:

From the Schedule Database, get SArrAp [the scheduled arrival airport] and the SArrTime [scheduled arrival time].

If PrelimDepDelay<Kf [a constant, for example, 0.1, which is indicative of the ability of the flight to regain a fraction of the time lost by departure delay]* (SArrTime−SDepTime) then AArrTime [assumed arrival time]=SArrTime Else AArrTime=SArrTime+PrelimDepDelay Arrival_Capacity_Calculation:

Get ArrApSchedDemand [number of flights scheduled to arrive—at the AArrTime—at SArrAp in the specified interval T, in this embodiment, initially 30 minutes] for SArrAp from the Schedule Database. Modify ArrAp-SchedDemand to eliminate those flights which do not actually fly and add unscheduled flights (such as general aviation, for example) which do fly.—If arrival within the hour use live air traffic data for this quantity.

Calculate the CurrentWxCond [quantized weather value—at the AArrTime—for the current weather, here, a value 1–10].

Retrieve the CurArrCapacityforWx [current arrival capacity in number of flights in the specified time interval T for AArrTime] from the Departure/Arrival Capacity Database for SArrAp and the CurrentWx-Cond.

If CurArrCapacityforWx<K2Ap [an airport-dependent constant], then increment specified time interval T, and go to Arrival_Capacity_Calculation [above, to recalculate based on the larger time interval T].

Else determine DemandDiff=(ArrApSchedDemand−CurArrCapacityforWx)

If (DemandDiff<K7ap [an airport-dependent constant]) then WxDelay=0

Else WxDelay=DemandDiff*(T/CurArrCapacityforWx)

Alternatively, WxDelay may be derived from a lookup value from a database calculated from historic data as to the time interval required to restore undelayed service for various values of DemandDiff.

A suitable algorithm for the process of box 46 is as follows:

If time of arrival is not within (for example) 5 hours, AvgArrDelay [defined in next paragraph]=0 [When arrival time is too remote, do not use current airport conditions to project delay in such flight. Can use weighting based on remoteness of arrival time.]

Else compute the AvgArrDelay [the average delay of flights arriving within a recent time period, such as a half hour, where the delay is the difference between actual and scheduled arrival times; see Table 5].

Compute ArrDelayTrend [trend in arrival delays; extrapolated from data in Table 5], and use to update AvgArrDelay for AArrTime.

If (AvgArrDelay>WxDelay), then PrelimArrDelay [preliminary delay contribution for arrival airport conditions]=AvgArrDelay Else PrelimArrDelay=WxDelay As described previously, the FAA has made available airport delay data, and such official airport delay data may be used in a variety of ways. In a further embodiment, the data may be used in lieu of calculating PrelimArrDelay in the manner above. Alternatively, the data may be used to provide a check upon or an update to PrelimArrDelay.

The departure capacity database and the arrival capacity database may optionally be structured on the basis of historic data for each airport to be listed in the database. For each airport, for example, there may first be recorded historic capacity data in relation to weather. The weather may be described contemporaneously in terms of parameters including precipitation rate, precipitation type (for example, rain, snow, hail), visibility, ceiling, wind velocity, wind direction, temperature, time of day, and season. In relation to these parameters are maintained the departure capacity of the airport and the arrival capacity of the airport. Next for departure capacity, for example, the capacity is divided into as many discrete value ranges as there are levels of quantization of weather. For each value range of capacity there are correlated the predominant weather parameter ranges, and an associated quantized weather value.

Figure 5:
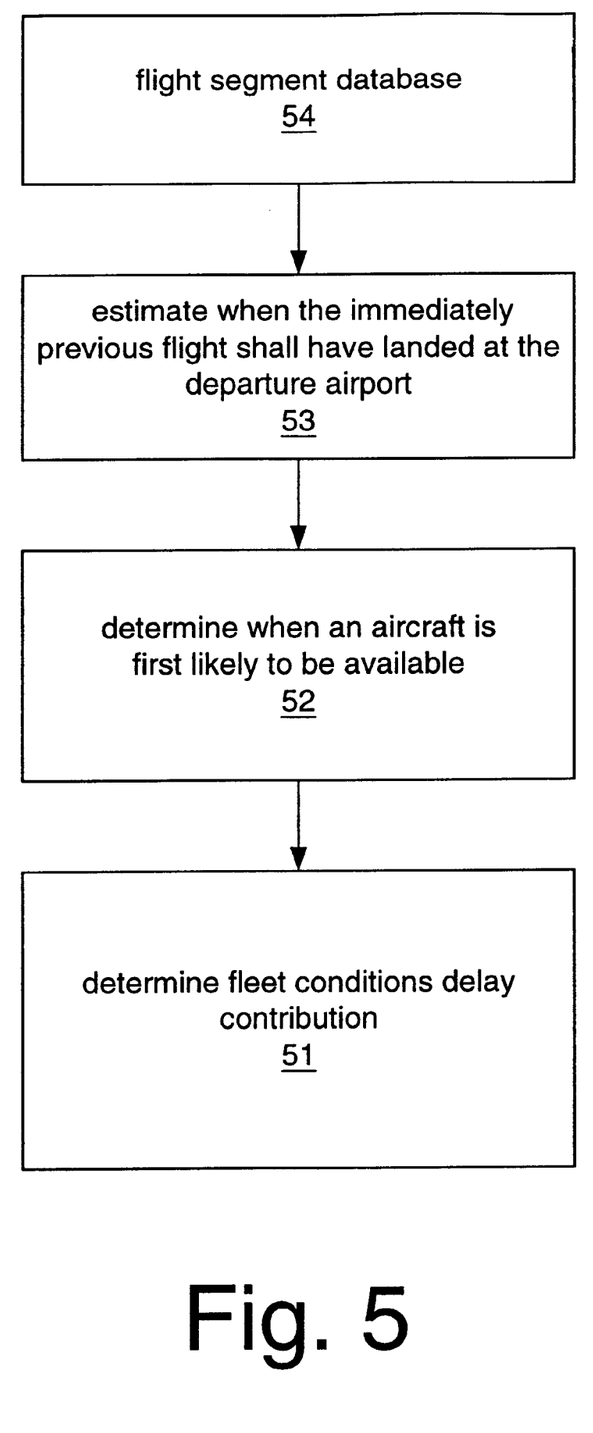
FIG. 5 is a block diagram showing further detail of the data flow in connection with the fleet conditions delay contribution in accordance with block 13 of FIG. 1.

FIG. 5 is a block diagram showing further detail of the data flow in connection with the fleet conditions delay contribution in accordance with block 13 of FIG. 1. In one embodiment, determination of the fleet conditions delay contribution in box 51 involves first accessing in box 54 a flight segment database. This database correlates, with any given flight, an immediately previous flight segment that is flown by the aircraft to be used in the given flight. (The importance of this database is that if the flight of the immediately previous flight segment is delayed, the aircraft used in the given flight may not be available to depart on schedule.) Information from the flight segment database permits estimating when the immediately previous flight segment aircraft shall have landed at the departure airport in accordance with box 53. Data from this process permit determining in box 52 when an aircraft is first likely to be available. This information then permits determining the fleet conditions delay contribution in box 51.

The flight segment database permits evaluating whether an incoming flight segment will contribute to delay of the planned flight. In practice if the previous flight segment lands at a time within a specified time interval (for example 1 hour) later than the planned departure, there will be a delay contribution equal to the amount by which that time is later than the planned departure plus a turnaround factor. If the previous flight segment lands at a time later than (for example) one hour after the planned departure, then one may consider whether other equipment will be used.

In this connection, there may be employed, as a supplement to the flight segment database, a fleet inventory database, which permits evaluating a fleet owner's current inventory of available equipment at each airport at a given time. "Available" in this context means all aircraft of a type suitable for the planned flight at the airport or due to arrive in a selected interval (for example, 90 minutes) less those aircraft that are assigned to scheduled flights.

Equipment in a fleet may suitably be tracked by tail number, namely the registration number associated with a given aircraft. Indeed, as an alternative to using an airline designator and airline flight number, one may, for example, identify a flight by aircraft tail number, scheduled departure time and departure airport. The flight segment database can optionally be constructed by employing tail numbers to correlate each flight number with a given item of equipment. Gate availability is also a potential factor contributing to departure delay. Gate availability is a function dependent on a number of factors, which may be airport specific and airline specific. Gate availability, as well as take-off and landing slots, may be understood as a factor affecting an airline's capacity at an airport. These factors may be modeled and taken into account in estimating departure delay. In one model they may be treated as a fleet condition. Alternatively, one or more of these factors may be treated in connection with airport capacity (for departures or landings) and handled as an airline-specific limitation on capacity at an airport.

A suitable algorithm for computing the fleet conditions delay contribution is as follows:

Determine arrival time at departure airport for immediately previous segment of flight aircraft.

If the arrival time is no later than (for example) 1 hour after the scheduled departure time, AlDepDelay [airline departure delay]=ArrTimePrev Seg [arrival time of the previous segment]+ AirlineTurnFactor [airline turnaround factor, the duration required for the airline to make a landing aircraft ready for takeoff, for example, 20 minutes]-SDepTime [scheduled departure time]

Else choose the fleet inventory database for availability of an aircraft not scheduled at departure airport.

If there is an available aircraft then, AlDepDelay= AirlinePrepFactor [airline preparation factor, the duration required for the airline to make a non-scheduled aircraft ready for takeoff, for example, 30 minutes].

As an alternative, or in addition, to the approach described in connection with FIG. 5, the fleet conditions delay contribution may be calculated on the basis of historical performance of the fleet. Such historical performance may be evaluated and tracked on a flight segment basis. Alternatively, or in addition, such historical performance may be evaluated utilizing data from the United States Department of Transportation (or from other sources) as to on-time performance of an airline's fleet; see, for example, in Tables 3 and 4, the field "On time %", which utilizes such data.

In connection with the processes described above, there are suitably employed a series of databases. The departure capacity database 415 and the arrival capacity database 416 may in fact be implemented by an integrated Departure/Arrival Airport Capacity Database having the structure set forth in Table 1 herein. Additionally there is the Flight Schedule Database 411, having the structure set forth in Table 2 herein. There is also the Flight Segment Database 54, having the structure set forth in Table 3 herein.

A suitable algorithm for creating the Arrival Airport Capacity portion of the Departure/Arrival Airport Capacity Database is as follows:

Each specified interval, in this embodiment, 30 minutes:
For each airport:
Retrieve the weather conditions
Calculate the CurrentWxCond [quantized weather value for the current weather, here, a value 1–10].
Retrieve CurLandingCapacityforWx for CurrentWxCond from the Airport Arrival Capacity Database.
Retrieve ActualArrivals [number of actual arrivals at pertinent airport during ascent time period, such as a half hour] AvgArrDelay [as previously defined, the average delay of flights arriving within the same recent time period], DelayedArrFlightCount [number of landing flights experiencing a delay from scheduled arrival during the same recent time period] from Actual Landings Database.
If ActualArrivals>CurLandingCapacityforWx, then CurLandingCapacityforWx=ActualArrivals [update Arrival Airport Capacity Database].
Else if (AvgArrDelay<5 minutes) [if average delay is small, for example less than five minutes] or (DelayedArrFlightCount/ActualArrivals<30% [if fewer than, for example, 30% of recent landings are delayed])
Then calculate new CurLandingCapacityforWx by averaging ActualArrivals with CurLandingCapacityforWx [the Arrival Airport Capacity Database is updated with an average of the previous value of CurLandingCapacityforWx and the ActualArrivals].

Similarly, a suitable algorithm for creating the Departure Airport Capacity portion of the Departure/Arrival Airport Capacity Database is as follows:

Each specified interval, in this embodiment, 30 minutes:
  For each airport:
    Retrieve the weather conditions
    Calculate the CurrentWxCond [quantized weather value for the current weather, here, a value 1–10].
    Retrieve CurDepCapacityforWx for CurrentWxCond from the Airport Departure Capacity Database.
    Retrieve ActualDepartures [number of actual departures at pertinent airport during a recent time period, such as a half hour], AvgDepDelay [as previously defined, the average delay of flights departing within the same recent time period], DelayedDepFlightCount [number of departed flights experiencing a delay from scheduled departure during the same recent time period] from Actual Departure Databases
    If ActualDepartures>CurDepartureCapacityforWx, then CurDepartureCapacityforWx = ActualDepartures [update Departure Airport Capacity Database].
    Else if (AvgDepDelay<5 minutes) [if average delay is small, for example less than five minutes] or (DelayedDepFlightCount/ActualDepartures>30% [if fewer than, for example, 30% of recent departures are delayed])
    Then calculate new CurDepartureCapacityforWx by averaging ActualDepartures with CurDepartureCapacityforWx [the Departure Airport Capacity Database is updated with an average of the previous value of CurDepartureCapacityforWx and the ActualDepartures].

In determining the recent average departure delay in accordance with the process of box 45, it is convenient to build an Actual Departures Table, the structure of which is shown in Table 4 herein. Table 4 also sets forth an algorithm suitable for creating the entries in the table. Similarly, in determining the recent average arrival delay in accordance with the process of box 46, it is convenient to build an Actual Arrivals Table, the structure of which is shown in Table 5 herein. Table 5 also sets forth an algorithm suitable for creating the entries in the table.

TABLE 1

Departure/Arrival Airport Capacity Database

| FieldName | Type | Content |
| --- | --- | --- |
| Airport Id | Alpha-numeric | ICAO code for the airport |
| DCWx1 | Numeric | Departure capacity for Weather Condition 1 |
| DCWx2 | Numeric | Departure capacity for Weather Condition 2 |
| DCWx3 | Numeric | Departure capacity for Weather Condition 3 |
| DCWx4 | Numeric | Departure capacity for Weather Condition 4 |
| DCWx5 | Numeric | Departure capacity for Weather Condition 5 |
| DCWx6 | Numeric | Departure capacity for Weather Condition 6 |
| DCWx7 | Numeric | Departure capacity for Weather Condition 7 |
| DCWx8 | Numeric | Departure capacity for Weather Condition 8 |
| DCWx9 | Numeric | Departure capacity for Weather Condition 9 |
| DCWx10 | Numeric | Departure capacity for Weather Condition 10 |
| ACWx1 | Numeric | Arrival capacity for Weather Condition 1 |
| ACWx2 | Numeric | Arrival capacity for Weather Condition 2 |
| ACWx3 | Numeric | Arrival capacity for Weather Condition 3 |
| ACWx4 | Numeric | Arrival capacity for Weather Condition 4 |
| ACWx5 | Numeric | Arrival capacity for Weather Condition 5 |
| ACWx6 | Numeric | Arrival capacity for Weather Condition 6 |
| ACWx7 | Numeric | Arrival capacity for Weather Condition 7 |
| ACWx8 | Numeric | Arrival capacity for Weather Condition 8 |
| ACWx9 | Numeric | Arrival capacity for Weather Condition 9 |
| ACWx10 | Numeric | Arrival capacity for Weather Condition 10 |

TABLE 2

Flight Schedule Database

| FieldName | Type | Content |
| --- | --- | --- |
| Operating Airline | Alphanumeric | Code for operating airline |
| Operating Flight# | Numeric | Flight number for operating airline |
| Booking Airline | Alphanumeric | Code for booking airline |
| Booking Flight # | Numeric | Flight number for booking airline |
| Sched Departure Airport | Alphanumeric | code for departure airport |
| Sched Time of Departure | Date/Time | Scheduled departure time |
| Sched Arrival Airport | Alphanumeric | code for arrival airport |
| Sched Time of Arrival | Date/Time | Scheduled arrival time |
| Day of Week Flown | Boolean | True when flight flies on day of week |
| Aircraft Type | Alphanumeric | Type of aircraft flown for this flight |
| Date Last Flown | Date | Date this flight flew last |
| On time % | Numeric | On time % provided to DOT |
| % Actually Flown | Numeric | % this flight flies as scheduled |

TABLE 3

Flight Segment Database

| FieldName | Type | Content |
|---|---|---|
| Booking Airline | Alphanumeric | Code for booking airline |
| Booking Flight # | Numeric | Flight number for booking airline |
| Sched Departure Airport | Alphanumeric | Code for departure airport |
| Sched Arrival Airport | Alphanumeric | Code for arrival airport |
| Date Last Flown | Date | Date this flight flew last |
| On time % | Numeric | On time % provided to DOT |
| % Actually Flown | Numeric | % this flight flies as scheduled |
| Prev Flight Segment | Flight#/DAp/AAp | Inbound airline flight for this flight's aircraft |
| Next Flight Segment | Flight#/Dap/AAp | Outbound airline flight for this flight's aircraft |
| Aircraft Type | Alphanumeric | Aircraft type for this flight |

TABLE 4

Actual Departures Table

| Airport | ActualDepartures | AvgDepDelay | DelayedDepFlightCount |
|---|---|---|---|

To Create Table:
For departure interval
  For each airport
    Retrieve ActualDepartures, DelayedDepFlightCount and AvgDepDelay for airport in Actual Departures Table
    For each flight departed from airport during departure interval
      Retrieve SDepTime [scheduled departure time] of flight
      Increment ActualDepartures
      DepartureDelay=DepartureTime [the flight departure time derived from live air traffic data]–SDepTime
      If DepartureDelay>K3ap [an airport-dependent constant, for example, 5 minutes] then increment DelayedDepFlightCount
    Calculate AvgDepDelay as representative of calculated DepartureDelay values for current departure interval. Suitable algorithm is to take average of non-outlier values in current interval.
    Update ActualDepartures, DelayedDepFlightCount and AvgDepDelay for airport in Actual Departures Table. For trend data, use a FIFO stack of n records with each record similar to that above; when stack is full, oldest record is displaced off the stack; use the contents of the stack to compute trend data.

TABLE 5

Actual Arrivals Table

| Airport | ActualArrivals | AvgArrDelay | DelayedArrFlightCount |
|---|---|---|---|

To Create Table:
For arrival interval
  For each airport
    Retrieve ActualArrivals, DelayedArrFlightCount and AvgArrDelayfor airport in Actual Arrivals Table
    For each flight arriving at airport during arrival interval
      Retrieve SArrTime [scheduled arrival time] of flight
      Increment ActualArrivals
      ArrivalDelay=ArrivalTime [the flight arrival time derived from live air traffic data]–SArrTime
      If ArrivalDelay>K8ap [an airport-dependent constant, such as 5 min.] then increment DelayedArrFlightCount
    Calculate AvgArrDelay as representative of calculated ArrivalDelay values for current arrival interval. Suitable algorithm is to take average of non-outlier values in current interval.
    Update ActualArrivals, DelayedArrFlightCount and AvgArrDelay for airport in Actual Arrivals Table. For trend data, use a FIFO stack of n records with each record similar to that above; when stack is full, oldest record is displaced off the stack; use the contents of the stack to compute trend data.

Figure 6:
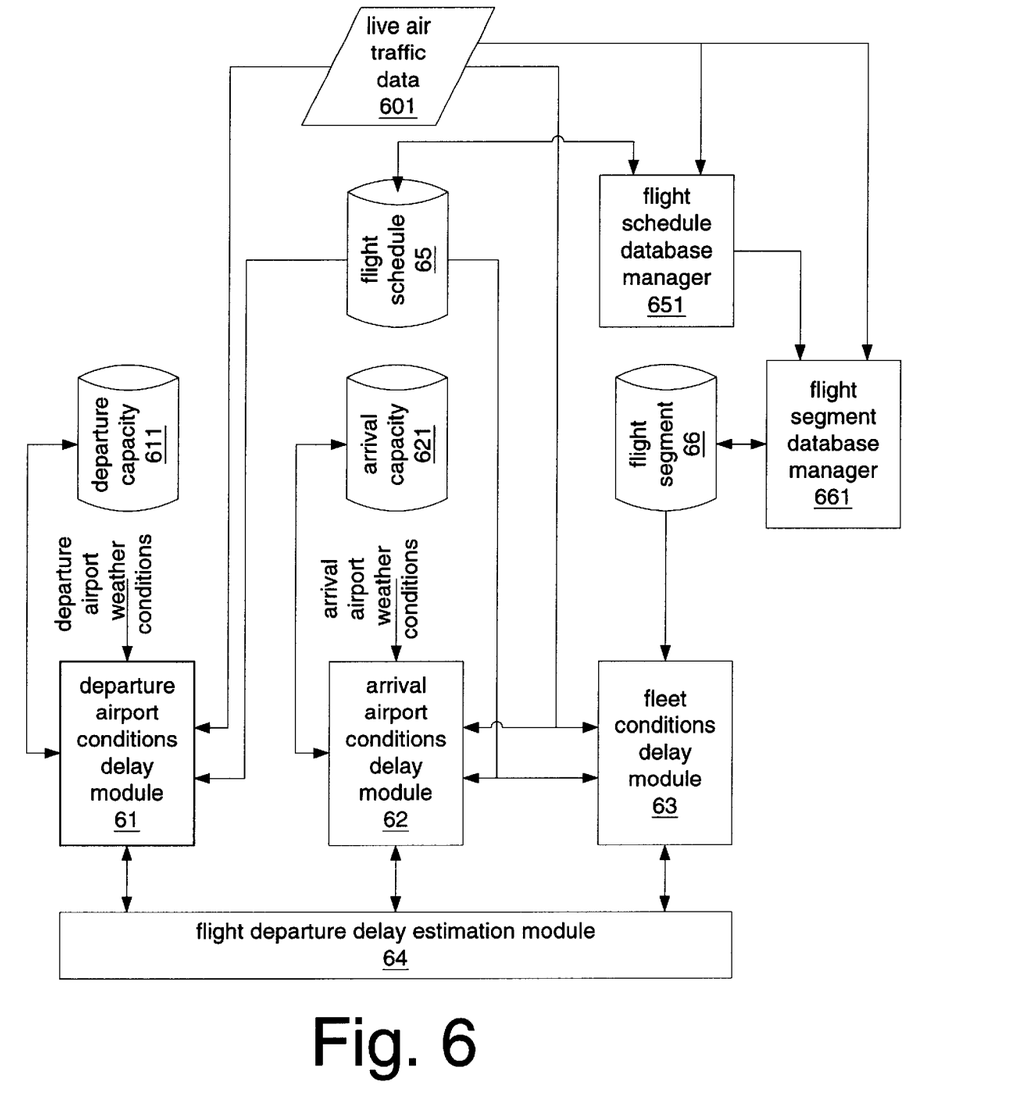
FIG. 6 is a block diagram of a system, in accordance with an embodiment of the present invention, for carrying out the methods of FIGS. 1 through 5.
Figure 7:
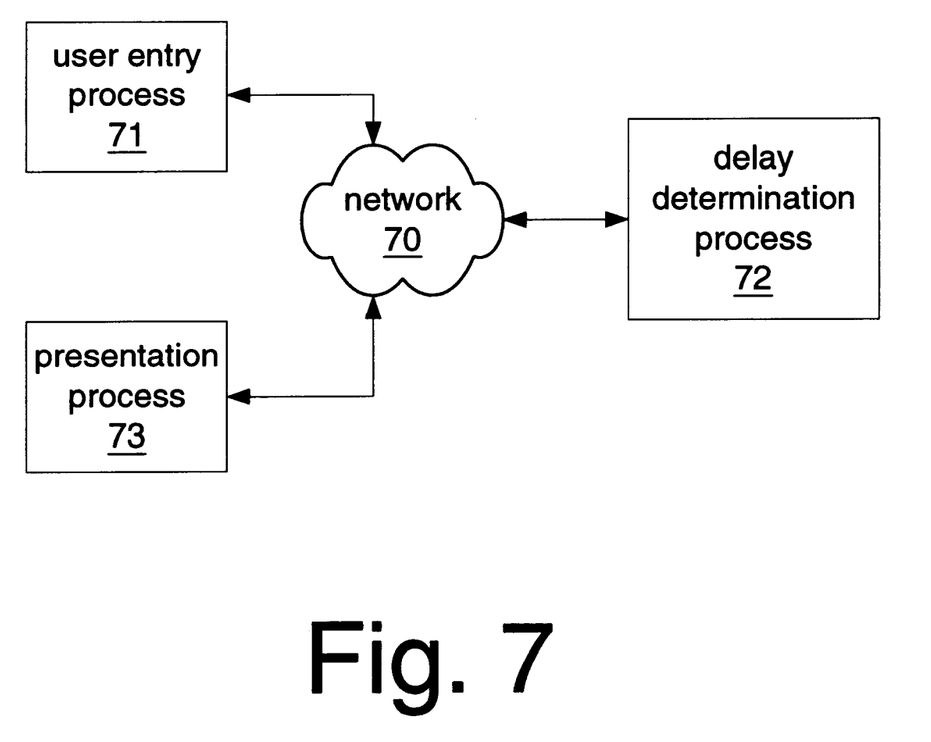
FIG. 7 is a block diagram of a system, in accordance with an embodiment of the present invention, providing a user interface for accessing departure delay information.

FIG. 6 is a block diagram of a system, in accordance with an embodiment of the present invention, for carrying out the methods of FIGS. 1 through 5. A flight departure delay estimation module 64 carries out the process of box 14 in FIG. 1, and optionally the process of box 18 of FIG. 1. The departure airport conditions delay module 61 determines the departure airport conditions delay contribution in the manner of the process of box 11 and optionally of box 15, as well as in the manner of the processes of FIG. 2 and remnant portions of FIG. 4. In this connection, the module 61 is coupled to both the departure capacity database 611 and the departure airport weather conditions input (for determining departure capacity). It is also coupled to the flight schedule database 65 and the live air traffic data 601 (for determining departure demand).

Similarly, the arrival airport conditions delay modue 62 determines the arrival airport conditions delay contribution in the manner of the process of box 12 and optionally box 16, as well as in the manner of the processes of FIG. 3 and relevant portions of FIG. 4. In this connection the module 62 is coupled to both the arrival capacity database 621 and the arrival weather conditions input (for determining arrival capacity). It is also coupled to the flight schedule database 65 and the live air traffic data 601 (for determining arrival demand).

The fleet conditions delay module 63 carries out the process of box 13 of FIG. 1, and optionally the process of box 17 of FIG. 1, as well as the processes of FIG. 5. In this connection the module 63 is coupled to the flight segment database 66, the flight schedule database 65, and to live air traffic data 601. The flight segment database 66 and the flight schedule database 65 are updated on the basis of live air traffic data 601 by flight segment database manager 661 and flight schedule database manager 651, which are coupled to the live air traffic data 601. The flight segment database 66 is also in communication with the flight schedule database 65 via an input from the flight segment database manager 661 that is coupled to the flight schedule database manager 651. The output from the flight departure delay estimation module 64 is data pertinent to the delay of a departing flight. The delay data can be calculated on an as-needed basis in response to a query. In another embodiment, however, the delay data can be stored in a suitable storage medium and updated on a recurring basis; and queries as to the delay data can then be directed to appropriate entries in the storage medium.

What is claimed is:

1. A method of estimating, in real time, the amount of any delay, from a planned departure time, in departure of an aircraft flight from an airport, the aircraft belonging to a fleet, the flight associated with a departure airport and an arrival airport, the method comprising:
   a. receiving in a first computer process a conditions input that includes at least one member of a set including departure airport conditions, arrival airport conditions, and fleet conditions; and
   b. estimating in a second computer process the amount of delay based on the conditions input.

2. A method according to claim 1, wherein (i) the conditions input includes at least two members of the set and (ii) estimating the amount of delay includes separately determining a delay contribution from each member of the set included in the conditions input.

3. A method according to claim 2, wherein the conditions input includes all three members of the set.

4. A method according to claim 2, wherein the conditions input includes departure airport conditions, and determining the delay contribution from the departure airport conditions includes determining, for the departure airport, the departure demand and the departure capacity.

5. A method according to claim 2, wherein determining the delay contribution from the departure airport conditions includes determining, for the departure airport, the departure demand and the departure capacity.

6. A method according to either of claims 4 or 5, wherein the departure airport conditions include weather at the departure airport, at an applicable departure time, and determining departure capacity at the departure airport includes evaluating a departure capacity function mapping weather conditions to capacity based on weather.

7. A method according to claim 6, wherein the departure capacity function is a table that is updated in real time on the basis of live air traffic data and weather condition data.

8. A method according to claim 4 or 5, wherein determining departure demand includes accessing a flight schedule database.

9. A method according to claim 4 or 5, wherein determining departure demand includes accessing a flight schedule database and live air traffic data.

10. A method according to claim 8, wherein the flight schedule database is updated in real time on the basis of live air traffic data.

11. A method according to claim 9, wherein the flight schedule database is updated in real time on the basis of live air traffic data.

12. A method according to either of claims 4 or 5, wherein determining the delay contribution from the departure airport conditions includes evaluating a first delay function of departure demand and departure capacity to obtain a preliminary departure delay contribution.

13. A method according to claim 12, wherein determining the delay contribution from the departure airport conditions includes determining a recent average departure delay and evaluating a second delay function of the recent average departure delay and the preliminary departure delay contribution.

14. A method according to claim 2, wherein the conditions input includes arrival airport conditions, and determining the delay contribution from the arrival airport conditions includes determining, for the arrival airport, the arrival demand and the arrival capacity.

15. A method according to claim 3, wherein determining the delay contribution from the arrival airport conditions includes determining, for the arrival airport, the arrival demand and the arrival capacity.

16. A method according to either of claims 14 or 15, wherein the arrival airport conditions include weather at the arrival airport, at an applicable arrival time, and determining arrival capacity at the arrival airport includes evaluating an arrival capacity function mapping weather conditions to capacity based on weather.

17. A method according to claim 16, wherein the arrival capacity function is a table that is updated in real time on the basis of live air traffic data and weather condition data.

18. A method according to either of claims 14 or 15 wherein determining arrival demand includes accessing a flight schedule database.

19. A method according to either of claims 14 or 15, wherein determining arrival demand includes accessing a flight schedule database and live air traffic data.

20. A method according to claim 18, wherein the flight schedule database is updated in real time on the basis of live air traffic data.

21. A method according to claim 19, wherein the flight schedule database is updated in real time on the basis of live air traffic data.

22. A method according to either of claims 14 or 15, wherein determining the delay contribution from the arrival airport conditions includes evaluating a first delay function of arrival demand and arrival capacity to obtain a preliminary arrival delay contribution.

23. A method according to claim 22, wherein determining the arrival delay contribution from the arrival airport conditions includes determining a recent average arrival delay and evaluating a second delay function of the recent average arrival delay and the preliminary arrival delay contribution.

24. A method according to claim 2, wherein determining the delay contribution from fleet conditions includes determining when an aircraft is first likely to be available for the planned flight.

25. A method according to claim 3, wherein determining the delay contribution from fleet conditions includes determining when an aircraft is first likely to be available for the planned flight.

26. A method according to either of claims 24 or 25, wherein determining when an aircraft is first likely to be available includes (i) accessing a flight segment database identifying, for an aircraft of the planned flight, an immediately previous flight number and departing airport; and (ii) estimating a landing time when the immediately previous flight shall have landed at the departure airport.

27. A method according to claim 26, wherein, if the landing time estimated is later by more than a threshold amount than the planned departure time, then determining wherein aircraft is first likely to be available includes determining when an alternative aircraft is first likely to be available.

28. A method according to claim 2, wherein determining the delay contribution from fleet conditions includes accessing historical fleet performance data providing historical performance of the fleet.

29. A method according to claim 28, wherein the historical fleet performance data include on-time performance data.

30. A method according to claim 2, wherein determining the delay contribution from at least one of departure airport conditions and arrival airport conditions includes using official airport delay data.

31. A method according to claim 2, wherein determining the delay contribution from each of departure airport conditions and arrival airport conditions includes using official airport delay data.

32. A system for estimating, in real time, the amount of any delay, from a planned departure time, in departure of an aircraft flight from an airport, the aircraft belonging to a fleet, the flight associated with a departure airport and an arrival airport, the system comprising:
   a. a first computer process for receiving a conditions input that includes at least one member of a set including departure airport conditions, arrival airport conditions, and fleet conditions; and
   b. a second computer process for estimating the amount of delay based on the conditions input.

33. A method according to claim 32, wherein (i) the conditions input includes at least two members of the set and (ii) the second computer process for estimating the amount of delay includes processes for separately determining a delay contribution from each member of the set included in the conditions input.

34. A system for estimating, in real time, the amount of any delay, from a planned departure time, in departure of an aircraft flight from an airport, the system comprising:
   a. a user entry process permitting a user to generate a delay query that provides flight parameters over a communications network sufficient to determine the aircraft flight;
   b. a delay determination process, in communication with the user entry process, that, substantially contemporaneously with the delay query, estimates a delay parameter associated with any delay in departure of the aircraft flight specified by the query; and
   c. a presentation process, in communication with the delay determination process, that presents to the user the delay parameter.

35. A system for estimating, in real time, the amount of any delay, from a planned departure time, in departure of an aircraft flight from an airport, the system comprising:
   a. a user entry process permitting a user to generate a delay query that provides flight parameters over a communications network sufficient to determine the aircraft flight;
   b. a delay determination process, in communication with the user entry process, that estimates a delay parameter associated with any delay in departure of the aircraft flight specified by the query, the delay parameter being a measure of the probability of a delay in departure; and
   c. a presentation process, in communication with the delay determination process, that presents to the user the delay parameter.

36. A system according to claim 35, wherein the measure is at least bi-valued.

37. A system according to claim 35, wherein the measure is at least tri-valued.

38. A system for estimating, in real time, the amount of any delay, from a planned departure time, in departure of an aircraft flight from an airport, the system comprising:
   a. a user entry process permitting a user to generate a delay query that provides flight parameters over a communications network sufficient to determine the aircraft flight;
   b. a delay determination process, in communication with the user entry process, that estimates a delay parameter associated with any delay in departure of the aircraft flight specified by the query, the delay parameter being an estimate of at least one of the most probable time of departure and the most probable amount of delay in departure; and
   c. a presentation process, in communication with the delay determination process, that presents to the user delay information corresponding to the delay parameter.

39. A system according to claim 38, wherein the delay information is a notification delivered a specified duration before the most probable time of departure.

40. A system according to claim 39, wherein the notification is delivered over a network and triggers an alarm.

* * * * *